United States Patent Office 2,757,156
Patented July 31, 1956

2,757,156

PLASTICIZING POLYAMIDES WITH N-ALKYL ALKANESULFONAMIDES

Joachim Dazzi, Dayton, Ohio, assignor to Monsanto Chemical Company, St. Louis, Mo., a corporation of Delaware No Drawing. Application February 3, 1953,
Serial No. 334,958

10 Claims. (Cl. 260—30.8)

This invention relates to plasticizing polyamides. In preferred aspects the invention pertains to polyamides plasticized with N-alkyl alkanesulfonamides.

The polyamides from which the present improved compositions are made are the synthetic linear polyamides of the general type disclosed in U. S. Patents 2,071,250, 2,071,253, and 2,130,948. The polymers there described are high molecular weight products, usually of intrinsic viscosity of at least 0.4, which can be cold drawn into strong, continuous, pliable textile fibers showing by X-ray examination orientation along the fiber axis. These polyamides, generally speaking, comprise the reaction product of a polyamide-forming composition in which the molecules are bifunctional and contain two amide-forming groups, each of which is complementary to an amide-forming group in other molecules in said composition.

The polyamides as defined above or as otherwise identified hereinafter can be obtained, for example, by self-polymerization of monoaminomonocarboxylic acids, or by reacting a diamine with a dibasic carboxylic acid in substantially equimolecular amounts. Likewise, interpolyamides can be obtained by reacting two or more diamines with one or more dibasic carboxylic acids, or by reacting two or more dibasic carboxylic acids with one or more diamines or by polymerizing a mixture of two or more monoaminomonocarboxylic acids, or of one or more of these amino acids with at least one diamine and at least one dibasic carboxylic acid. These linear polyamides include also polymers obtained by admixture of other linear polymer-forming reactants, as for instance glycol-dibasic acid mixtures in the case of polyesteramides, with the mentioned polyamide-forming reactants. In either instance the amide group is an integral part of the main chain of atoms in which the average number of atoms separating the amide groups is preferably at least two. On hydrolysis with hydrochloric acid the amino acid polymers yield the amino acid hydrochloride and the diamine-dibasic acid polymers yield the diamine hydrochloride and the dibasic carboxylic acid. As will be apparent from the foregoing, the polyamides with which this invention is concerned can be generally described as synthetic linear high molecular weight polymeric carbonamides in which the amide groups are integral parts of the polymer chain and are separated by hydrocarbon groups of at least two carbon atoms.

Synthetic polyamides, often referred to as "super polyamides," have had much commercial success. They can be used in many different physical forms. However, the polyamides are not suitable for many uses without modification because of their relatively narrow melting point range and because they are extremely tough and difficult to fabricate. It is therefore necessary to provide a plasticizer which is compatible with the polyamide at reasonable concentration and which also will impart flexibility and processability. It is particularly important that the property of flexibility at relatively low temperatures be provided in plasticized polyamides. Suitably plasticized polyamides have many potential uses in tubing, film, wire covering, gaskets, artificial leather, hammer heads, loom pickers, etc.

In accordance with the present invention, synthetic linear polyamides are plasticized by the incorporation therein of N-alkyl alkanesulfonamides containing from 6 to 12 carbon atoms in the alkane group and a single alkyl group containing from 1 to 5 carbon atoms substituted on the nitrogen atom of the sulfonamide group and having no more than 15 carbon atoms in the molecule. The sulfonamides in question can be represented by the general formula:

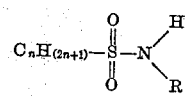

wherein $n$ is an integer from six (6) to twelve (12), inclusive, and R is an alkyl group containing from 1 to 5 carbon atoms, inclusive, and the molecule contains no more than 15 carbon atoms.

It is to be understood that the foregoing formula is not intended to indicate the particular location of the attachment of the sulfonamide group to the alkane residue, as in most instances the N-alkyl alkanesulfonamide material employed as plasticizer will in actuality be a mixture of N-alkyl alkanesulfonamides having the sulfonamide grouping attached at a variety of locations on the alkane group, such a mixture being normally formed by the usual methods of synthesis. Such synthesis usually involves the sulfochlorination of paraffinic hydrocarbons (either normal or branched chain) of the desired number of carbon atoms in the alkane residue, as by reaction of the paraffin with a mixture of sulfur dioxide and chlorine in known manner, followed by reacting the resulting sulfonyl chloride with a primary alkyl amine having from 1 to 5 carbon atoms in the alkyl group. Although it is not outside of the broad scope of this invention to employ N-alkyl alkanesulfonamides having substituted on the alkane and/or alkyl group non-interfering non-hydrocarbon radicals which do not interfere with the plasticizing action, I ordinarily prefer that such substituents be absent.

The N-alkyl alkanesulfonamides as described above impart to polyamides very marked low temperature flexibility. They are compatible in the polyamides to a considerable extent, usually at least to the extent of 25 p. h. r. (parts per hundred parts resin by weight) and higher, though the maximum compatibility varies with the particular N-alkyl alkanesulfonamide and particular polyamide used together. Compatibility is readily determined in any particular instance by known methods, for example by adding the plasticizer in varying quantities to several samples of a 10 weight per cent solution of the polyamide in a solvent such as 80 per cent ethanol-20 per cent water, casting a film no thicker than 0.01 cm., and drying at 70° C. Compatibility of plasticizer and polyamide is determined by inspection of the dried film after removal from the casting plate. Any indications of flushing, opalescence, exudation, blooming, or crystallization are signs of incompatibility.

The plasticized polyamide compositions of the present invention can be prepared by any suitable method of mixing polyamide with plasticizer. For example, the polyamide and plasticizer can be dissolved in a common organic solvent and a film cast from that solvent, or threads or fibers or other structures can be spun from the solution. For molded articles, the polyamides can be worked in known manner as on rolls, mixers, etc. in the presence of added plasticizer which thereby becomes intimately incorporated with the polyamide. Films and other polyamide structures can be soaked in a solution of a plasticizer in a non-solvent for the polyamides, for example an aqueous alcohol containing sufficient water to avoid substantial solution of the polyamide, whereby the N-alkyl alkanesulfonamide plasticizer is preferentially soaked or absorbed by the polyamide structure from the solution.

By way of example of N-alkyl alkanesulfonamides which can be used in accordance with this invention, there can be mentioned: N-ethyl x-n-heptanesulfonamide, wherein the x indicates indeterminate point or points of substitution of the sulfonamide group on non-terminal carbon atoms of normal heptane, having the formula: $C_7H_{15}SO_2NHC_2H_5$; N-n-amyl x-octanesulfonamide prepared from normal octane or branched chain octanes by the chlorosulfonation thereof followed by reaction of the sulfonyl chloride with n-amyl amine; N-butyl x-n-octanesulfonamide prepared by reaction of a butyl amine with x-n-octanesulfonyl chloride; N-isopropyl x-decanesulfonamide wherein the decane residue can be branched chain or straight chain; N-methyl x-n-decanesulfonamide; mixed N-ethyl sulfonamides of a mixture of paraffin hydrocarbons containing at least 7 and not more than 10 carbon atoms per molecule prepared by reacting ethyl amine with the product of sulfochlorinating such a mixture of paraffin hydrocarbons; N-sec-butyl x-2-methylpentanesulfonamide. The foregoing are named by way of example and those skilled in the art will understand the various N-alkyl alkanesulfonamides not specifically mentioned herein but within the terms of the invention. Of course a polyamide resin can be plasticized with a mixture of two or more of these N-alkyl alkanesulfonamides, and other plasticizers, extenders, resins, pigments, heat stabilizers, light stabilizers, etc. can be incorporated in the plasticized polyamide by known methods.

My N-alkyl alkanesulfonamide plasticizers as disclosed herein can be used with any of the polyamides of the kind described in the above-mentioned patents which are subject to improvement by the use of plasticizing agents. Because of their greater inherent flexibility, it is preferred to use the interpolyamides obtained from a mixture of at least two different polyamide-forming compositions rather than the straight polyamides. This mixture can contain two or more different diamines and one or more dibasic carboxylic acid or vice versa, or can consist of two different monoaminomonocarboxylic acids, or of a mixture of at least one amino acid with at least one diamine and at least one dibasic carboxylic acid. Other linear polymer-forming reactants can also be included in the composition from which the polyamide is made. It is to be understood that reference herein to the amino acids, dibasic carboxylic acids, and diamines is intended to include the equivalent amide-forming derivatives of the amino acids, the dicarboxylic acids, and the diamines. Amide-forming derivatives of the amino acids include the esters, anhydrides, amides, lactams, acid halides, N-formyl derivatives, carbamates, and nitriles in the presence of water. Amide-forming derivatives of the dibasic carboxylic acids comprise the mono- and di-esters, the anhydrides, the mono- and di-amides, acid halides, and the following compounds in the presence of water: nitriles, cyanocarboxylic acids, cyanoamides, and cyclic imides. Amide-forming derivatives of the diamines include the carbamates, N-formal derivatives and the N,N'-diformyl derivatives.

Examples of particular polyamides that may be mentioned as useful in the practice of this invention are polyhexamethylene adipamide, polyhexamethylene sebacamide, polydecamethylene adipamide, polydecamethylene sebacamide, polytetramethylene adipamide, the polyamides obtained from either 1,4-xylylene diamine or meta-phenylenediamine with either adipic or sebacic acids, the polyamides obtained from 6-aminocaproic acid and 12-aminostearic acid, the interpolyamides obtained from mixtures of hexamethylenediamine, adipic acid and 6-aminocaproic acid, the interpolyamides obtained from mixtures of hexamethylenediamine, adipic acid, sebacic acid and 6-aminocaproic acid, etc.

Additional examples of the neutral carboxylic acid esters are:

Ethyl carboethoxymethyl phthalate,

$C_2H_5OCOC_6H_4COOCH_2COOC_2H_5$

Isobutyl carboisobutoxymethyl phthalate,

$(CH_3)_2CHCH_2OCOC_6H_4COOCH_2COOCH_2CH(CH_3)_2$

Di-(carboisobutoxymethyl)phthalate,

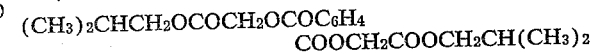
$(CH_3)_2CHCH_2OCOCH_2OCOC_6H_4$
$COOCH_2COOCH_2CH(CH_3)_2$

Butyl carbobutoxymethyl adipate,

$C_4H_9OCO(CH_2)_4COOCH_2COOC_4H_9$

Ethyl carboethoxymethyl sebacate

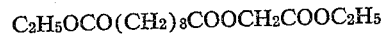
$C_2H_5OCO(CH_2)_8COOCH_2COOC_2H_5$

Di-(carboisobutoxymethyl)adipate,

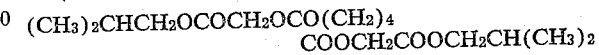
$(CH_3)_2CHCH_2OCOCH_2OCO(CH_2)_4$
$COOCH_2COOCH_2CH(CH_3)_2$

Di-[carbo-(2-methoxyethoxy)methyl]sebacate,

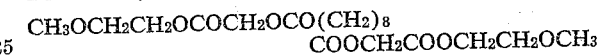
$CH_3OCH_2CH_2OCOCH_2OCO(CH_2)_8$
$COOCH_2COOCH_2CH_2OCH_3$

Isobutyl carboisobutoxymethyl maleate,

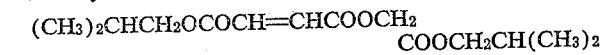
$(CH_3)_2CHCH_2OCOCH=CHCOOCH_2$
$COOCH_2CH(CH_3)_2$

Di-(carboethoxymethyl)maleate,

$C_2H_5OCOCH_2OCOCH=CHCOOCH_2COOC_2H_5$

Amyl carboamyloxymethyl oxalate,

$C_5H_{11}OCOCOOCH_2COOC_5H_{11}$

Di-(carbomethoxymethyl)oxalate,

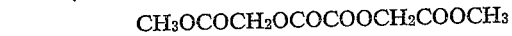
$CH_3OCOCH_2OCOCOOCH_2COOCH_3$ 2-methoxyethyl[carbo-(2-methoxyethoxy)methyl]-succinate,

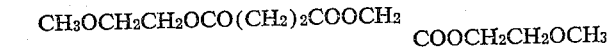
$CH_3OCH_2CH_2OCO(CH_2)_2COOCH_2$
$COOCH_2CH_2OCH_3$

Cyclohexyl carbocyclohexyloxymethyl azelate,

$C_6H_{11}OCO(CH_2)_7COOCH_2COOC_6H_{11}$

Di(carbopropoxymethyl)azelate,

$C_3H_7OCOCH_2OCO(CH_2)_7COOCH_2COOC_3H_7$

Methyl carbobutoxymethyl malonate,

$CH_3OCOCH_2COOCH_2COOC_4H_9$

Di-(carbobenzoxymethyl)malonate,

$C_6H_5CH_2OCOCH_2OCOCH_2COOCH_2COOCH_2C_6H_5$

Carboethoxymethyl palmitate,

$CH_3(CH_2)_{14}COOCH_2COOC_2H_5$

Carboisobutoxymethyl benzoate,

$C_6H_5COOCH_2COOCH_2CH(CH_3)_2$

Carbobutoxymethyl octanoate,

$CH_3(CH_2)_6COOCH_2COOC_4H_9$

Butyl 1-(carbobutoxy)ethyl phthalate,

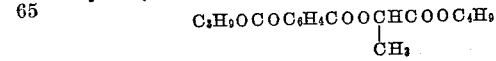
$C_4H_9OCOC_6H_4COOCHCOOC_4H_9$
$\quad\quad\quad\quad\quad\quad\quad\quad\;|$
$\quad\quad\quad\quad\quad\quad\quad\quad CH_3$ Isobutyl 1-(carboisobutoxy)ethyl adipate,

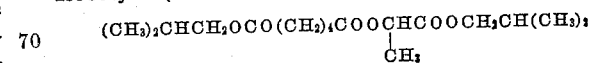
$(CH_3)_2CHCH_2OCO(CH_2)_4COOCHCOOCH_2CH(CH_3)_2$
$\quad\quad\quad\quad\quad\quad\quad\quad\quad\quad\quad\quad\;|$
$\quad\quad\quad\quad\quad\quad\quad\quad\quad\quad\quad\quad CH_3$ Isobutyl-1-(carbobutoxy)propyl phthalate,

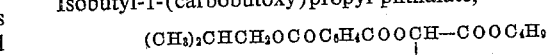
$(CH_3)_2CHCH_2OCOC_6H_4COOCH—COOC_4H_9$
$\quad\quad\quad\quad\quad\quad\quad\quad\quad\quad\quad\quad\;|$
$\quad\quad\quad\quad\quad\quad\quad\quad\quad\quad\quad\quad C_2H_5$ Methyl (1-carboethoxy-1-methyl)ethyl phthalate,

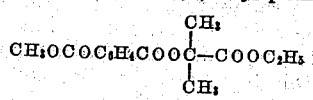

Ethyl (2-carboethoxy)ethyl phthalate,

The following example is provided to illustrate advantages of a preferred embodiment of the invention. It will, of course, be understood that variations in the particular super polyamide resin, the particular N-alkyl alkanesulfonamide plasticizer, and the proportions can be made without departing from the invention.

EXAMPLE x-n-Heptanesulfonyl chloride was made by bubbling a mixture of $SO_2$ and $Cl_2$ through n-heptane at room temperature under influence of ultraviolet light, and recovering the heptanesulfonyl chloride by distillation of the reaction product.

x-n-Heptanesulfonyl chloride so prepared was reacted with monoethylamine as follows to form the N-ethyl x-n-heptanesulfonamide.

A 33 per cent aqueous solution of monoethylamine containing 1.05 moles of the latter was held at 35° C. with stirring. Into this solution was dropped, over a period of one hour and 20 minutes, 0.5 mole $C_7H_{15}SO_2Cl$. At the end of this addition the material had turned neutral, indicating reaction was taking place. There was then started the addition of a mixture of 0.5 mole $C_7H_{15}SO_2Cl$ and 1 mole NaOH dissolved together in 100 ml. of water, at a rate keeping the pH of the reaction mixture slightly red to phenolphthalein, and for a period of time of one hour and 30 minutes. The reaction mixture was then stirred for an additional 2 hours at 40° C. keeping it slightly alkaline, cooled, and the oil layer separated from the water layer. The latter was extracted with ether. The extract and oil layer together were dried over sodium sulfate, distilled, and finally heated at 1 to 2 mm. pressure of nitrogen at 80° C. for 2 hours. The distillation residue was then stirred with 1 gram of adsorptive clay and filtered. The resulting product, N-ethyl x-n-heptanesulfonamide was a light yellow liquid, freezing below minus 25° C., and having a refractive index of $n_D^{25}$ of 1.4638.

This N-ethyl x-n-heptanesulfonamide was tested as plasticizer in a synthetic linear polyamide sold under the trade name, "Nylon FM 101," which is adapted to be processed and molded with conventional molding equipment and techniques. Properties of unplasticized "Nylon FM 101" are:

Specific gravity _____ 1.12.
Tensile strength:
  −70° F _____ 13,600 p. s. i.
  +77° F _____ 9,480 p. s. i.
  +170° F _____ 6,870 p. s. i.
Elongation:
  −70° F _____ 8.0%.
  +77° F _____ 418%.
  +170° F _____ 490%.
Modulus of elasticity, 77° F _____
Flexural strength, 77° F _____ 3,670 p. s. i. (did not break).
Stiffness, 77° F _____ 70,500 p. s. i.
Impact, izod:
  −70° F _____ 0.29 ft. lb./in.
  +77° F _____ Did not break.
  +170° F _____ Did not break.
Rockwell _____ R 107.
Flow temperature _____ 154° C.
Heat distortion temp., 66 p. s. i. _____ 99° F.
Coefficient of linear expansion _____ $8.2 \times 10^{-5}$/° F.
Thermal conductivity _____ 1.9 B. t. u./hr./ft.$^2$/° F./in.
Dielectric strength—short time _____ 420 v./mil (0.150 in.).
Dielectric strength—step by step _____ 415 v./mil (0.150 in.).
Volume resistivity _____ $5.1 \times 10^{13}$ ohm-cm.
Dielectric constant:
  $10^3$ cycles _____ 6.35.
  $10^6$ cycles _____ 4.10.
  $10^8$ cycles _____ 6.35.
Power factor:
  $10^3$ cycles _____ 0.079.
  $10^6$ cycles _____ 0.046.
  $10^8$ cycles _____ 0.005.
Water absorption _____ 2.3%.
Flammability _____ Self-extinguishing.

Satisfactory molded articles can be obtained from Nylon FM 101 only if its moisture content is less than 0.3 weight per cent. Therefore prior to milling and molding test samples, the nylon was dried for 3 hours at 80° C. under vacuum, reducing the moisture content to 0.25 per cent. Nylon, due to its inherent toughness, is difficult to mill and mold. To facilitate removal from the rolls 0.5 weight per cent sodium stearate was added to each plasticized nylon composition as a lubricant. The combination of nylon and plasticizer was fluxed on rolls for 5 minutes at 160° C. Since nylon tends to adhere to a cold roll, the composition was removed from the rolls by cooling that roll with the doctor blade to 50° C., and the other roll to 100° C. When all of the composition had transferred to the cold roll, the material was removed with the doctor blade. Test samples of the composition thus prepared were compression molded in conventional manner, with the exception that cellophane was placed on both sides of the composition to prevent sticking.

Plasticized polyamides take up appreciable quantities of water from the atmosphere on standing, which water itself acts as an additional plasticizer and affects to a considerable extent the low temperature flexibility of the composition. To determine the effect of moisture on the compositions, low temperature flexibility was determined on compositions conditioned for 24 hours in a desiccator, and for 7 days at 25° C. in a room having 50 per cent relative humidity.

Low temperature flexibility was determined by the method of Clash and Berg, Ind. Eng. Chem., 34 1218 (1942). This test measures the degree of twist obtained in 5 seconds with a given torsion load at varying temperatures on a test strip of the plastic, 0.04 inch thick. The $T_f$ is the temperature at which a twist of 200° of arc is produced in 5 seconds, and is a good approximation of the temperature below which the plastic has no appreciable elastomeric qualities. This is a well-known standard test.

The quantity of plasticizer used was 25 weight per cent of the total weight of nylon-plus-plasticizer. The well-known commercial plasticizer called "Santicizer 8" was used as a control. This is the best plasticizer known for nylon up to the present time, and is a mixture of N-ethyl-orthotoluenesulfonamide and N-ethyl-paratoluenesulfonamide.

The low temperature flexibility data obtained by the described procedure are as follows:

*Low temperature flexibility of nylon*

| Plasticizer (25 wt. percent) | $T_f$, ° C. | |
|---|---|---|
| | Dried 24 hours in desiccator | Conditioned 7 days at 25° C., 50% relative humidity |
| None | | |
| Mixed N-ethyl o- and p-toluenesulfonamides | +28° C. | +1° C. |
| N-ethyl x-n-heptane-sulfonamide | 0° C. | −11° C. |
| | −3.7° C. | −14.8° C. |

It will be seen that, in accordance with the present invention, N-ethyl n-x-heptanesulfonamide very markedly reduces the low temperature flexibility of dry nylon from plus 28° C. to essentially minus 4° C. Under conditions allowing considerable moisture pick-up (7 days at 25° C. and 50 per cent relative humidity) the $T_f$ value was further decreased to essentially minus 15° C. as compared with plus 1° C. for the nylon containing no plasticizer. Both with the dry nylon and the nylon which had picked up moisture, these results were considerably superior to those obtained with the same quantity of the standard commercial nylon plasticizer control, N-ethyl-ortho and para-toluenesulfonamide. It is thus clear that the plasticizer of the present invention is outstanding.

While the invention has been described herein with particular reference to various preferred embodiments thereof, and examples have been given of suitable proportions and conditions, it will be appreciated that variations from the details given herein can be effected without departing from the invention in its broadest aspects.

I claim:

1. A synthetic linear high molecular weight polymeric carbonamide in which the amide groups are integral parts of the polymer chain and are separated by hydrocarbon groups of at least two carbon atoms, plasticized with a mixture of N-ethyl n-heptanesulfonamides wherein the sulfonamide grouping is attached at a variety of locations on the n-heptane group.

2. A synthetic linear high molecular weight polymeric carbonamide in which the amide groups are integral parts of the polymer chain and are separated by hydrocarbon groups of at least two carbon atoms, plasticized with an N-alkyl alkanesulfonamide material having the structural formula:

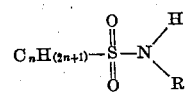

wherein $n$ is an integer from 6 to 12 inclusive and R is an alkyl group containing from 1 to 5 carbon atoms inclusive and the molecule contains no more than 15 carbon atoms, said material being a mixture of N-alkyl alkanesulfonamides wherein the sulfonamide grouping is attached at a variety of locations on the alkane group.

3. A synthetic linear high molecular weight polymeric carbonamide in which the amide groups are integral parts of the polymer chain and are separated by hydrocarbon groups of at least two carbon atoms, plasticized with 25 weight per cent of a mixture of N-ethyl n-heptanesulfonamides wherein the sulfonamide grouping is attached at a variety of locations on the n-heptane group.

4. A synthetic linear high molecular weight polymeric carbonamide in which the amide groups are integral parts of the polymer chain and are separated by hydrocarbon groups of at least two carbon atoms, plasticized with up to 25 weight per cent of a mixture of N-ethyl alkanesulfonamides wherein the sulfonamide grouping is attached at a variety of locations on the alkane group, said alkane group having from 6 to 12 carbon atoms.

5. A composition of matter comprising at least one synthetic linear high molecular weight polymeric carbonamide in which the amide groups are integral parts of the polymer chain and are separated by hydrocarbon groups of at least two carbon atoms, intimately admixed with a plasticizing compatible amount of an N-alkyl alkanesulfonamide material having the structural formula:

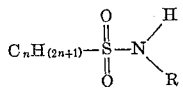

wherein $n$ is an integer from 6 to 12 inclusive and R is an alkyl group containing from 1 to 5 carbon atoms inclusive and the molecule contains no more than 15 carbon atoms, said material being a mixture of N-alkyl alkanesulfonamides wherein the sulfonamide grouping is attached at a variety of locations on the alkane group.

6. A composition of matter comprising at least one synthetic linear high molecular weight polymeric carbonamide in which the amide groups are integral parts of the polymer chain and are separated by hydrocarbon groups of at least two carbon atoms, intimately admixed with a plasticizing compatible amount of an N-alkyl alkanesulfonamide material having the structural formula:

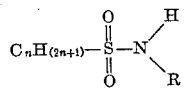

wherein $n$ is an integer from 6 to 12 inclusive and R is an alkyl group containing from 1 to 5 carbon atoms inclusive and the molecule contains no more than 15 carbon atoms, said material being a mixture of N-alkyl alkanesulfonamides wherein the sulfonamide grouping is attached at a variety of locations on the alkane group, said synthetic linear high molecular weight polymeric carbonamide being one which on hydrolysis with hydrochloric acid yields a material selected from the group consisting of (a) the hydrochloride of a monoamino-monocarboxylic acid and (b) a mixture of diamine hydrochloride and a dibasic carboxylic acid.

7. A synthetic linear high molecular weight polymeric carbonamide in which the amide groups are integral parts of the polymer chain and are separated by hydrocarbon groups of at least two carbon atoms, intimately admixed with a plasticizing compatible amount of a mixture of N-ethyl n-heptanesulfonamides wherein the sulfonamide grouping is attached at a variety of locations on the n-heptane group.

8. A synthetic linear high molecular weight polymeric carbonamide in which the amide groups are integral parts of the polymer chain and are separated by hydrocarbon groups of at least two carbon atoms, plasticized with a mixture of N-butyl n-octanesulfonamides wherein the sulfonamide grouping is attached at a variety of locations on the n-octane group.

9. A synthetic linear high molecular weight polymeric carbonamide in which the amide groups are integral parts of the polymer chain and are separated by hydrocarbon groups of at least two carbon atoms, plasticized with a mixture of N-isopropyl decanesulfonamides wherein the sulfonamide grouping is attached at a variety of locations on the decane group.

10. A synthetic linear high molecular weight polymeric carbonamide in which the amide groups are integral parts of the polymer chain and are separated by hydrocarbon groups of at least two carbon atoms, plasticized with mixed N-ethyl sulfonamides of a mixture of paraffin hydrocarbons containing at least 7 and not more than 10 carbon atoms per molecule wherein the sulfonamide grouping is attached at a variety of locations on the paraffin hydrocarbon groups.

References Cited in the file of this patent

UNITED STATES PATENTS 2,214,405    Coffman            Sept. 10, 1940